United States Patent
Luo et al.

(10) Patent No.: US 7,469,294 B1
(45) Date of Patent: Dec. 23, 2008

(54) METHOD AND SYSTEM FOR PROVIDING AUTHORIZATION, AUTHENTICATION, AND ACCOUNTING FOR A VIRTUAL PRIVATE NETWORK

(75) Inventors: Wei Luo, San Jose, CA (US); Eric Rosen, Chelmsford, MA (US)

(73) Assignee: Cisco Technology, Inc., San Jose, CA (US)

( * ) Notice: Subject to any disclaimer, the term of this patent is extended or adjusted under 35 U.S.C. 154(b) by 569 days.

(21) Appl. No.: 10/051,861

(22) Filed: Jan. 15, 2002

(51) Int. Cl.
G06F 15/16 (2006.01)
G06F 15/173 (2006.01)
H04J 3/16 (2006.01)
H04L 12/28 (2006.01)
H04M 1/66 (2006.01)

(52) U.S. Cl. .............. 709/229; 709/224; 709/225; 709/227; 709/228; 709/220; 370/469; 370/406; 455/411

(58) Field of Classification Search ......... 709/229, 709/225, 226, 224, 228, 227, 220; 370/351, 370/469, 406; 455/411
See application file for complete search history.

(56) References Cited

U.S. PATENT DOCUMENTS

| | | | | |
|---|---|---|---|---|
| 6,016,318 A * | 1/2000 | Tomoike | ............ | 709/249 |
| 6,119,160 A * | 9/2000 | Zhang et al. | ............ | 709/224 |
| 6,161,144 A * | 12/2000 | Michels et al. | ............ | 709/238 |
| 6,226,751 B1 * | 5/2001 | Arrow et al. | ............ | 726/15 |
| 6,606,744 B1 * | 8/2003 | Mikurak | ............ | 717/174 |
| 6,765,881 B1 * | 7/2004 | Rajakarunanayake | ....... | 370/256 |
| 6,874,030 B1 * | 3/2005 | Sheth et al. | ............ | 709/229 |
| 6,879,690 B2 * | 4/2005 | Faccin et al. | ............ | 380/247 |
| 7,036,142 B1 * | 4/2006 | Zhang et al. | ............ | 726/12 |
| 7,107,620 B2 * | 9/2006 | Haverinen et al. | ............ | 726/29 |
| 7,174,018 B1 * | 2/2007 | Patil et al. | ............ | 380/258 |
| 7,206,826 B1 * | 4/2007 | Parker et al. | ............ | 709/220 |
| 7,315,554 B2 * | 1/2008 | Baum et al. | ............ | 370/469 |
| 7,328,268 B1 * | 2/2008 | Foltak et al. | ............ | 709/228 |
| 7,379,465 B2 * | 5/2008 | Aysan et al. | ............ | 370/409 |
| 2002/0010865 A1 * | 1/2002 | Fulton et al. | ............ | 709/229 |
| 2002/0026573 A1 * | 2/2002 | Park | ............ | 713/155 |
| 2002/0034939 A1 * | 3/2002 | Wenzel | ............ | 455/411 |
| 2002/0069278 A1 * | 6/2002 | Forslow | ............ | 709/229 |

(Continued)

FOREIGN PATENT DOCUMENTS

EP 1014619 A1 * 6/2000

OTHER PUBLICATIONS

Rigney et al, RFC 2865 "Remote Authentication Dial In User Service (Radius)" Jun. 2000, pp. 1-76.*

(Continued)

*Primary Examiner*—John Follansbee
*Assistant Examiner*—Karen C Tang
(74) *Attorney, Agent, or Firm*—Cindy Kaplan (57) ABSTRACT

A method and system for providing authentication in a virtual private network having a private AAA server is disclosed. The method generally includes receiving a request from a remote user for connection with a virtual private network at a virtual home gateway and associating the remote user with the virtual private network The virtual home gateway sends a request to authenticate the remote user to the AAA server. The remote user is then connected to the virtual private network if the AAA server authenticates the user.

22 Claims, 6 Drawing Sheets

U.S. PATENT DOCUMENTS

| | | | |
|---|---|---|---|
| 2002/0075844 A1* | 6/2002 | Hagen | 370/351 |
| 2003/0079021 A1* | 4/2003 | Fan | 709/227 |
| 2005/0198294 A1* | 9/2005 | Chandrupatla et al. | 709/225 |
| 2005/0254651 A1* | 11/2005 | Porozni et al. | 380/270 |
| 2006/0129807 A1* | 6/2006 | Halasz et al. | 713/163 |

OTHER PUBLICATIONS

Zorn et al, RFC 2867 "Radius Accounting Modication for Tunnel Protocol Support" Jun. 2000 pp. 1-11.*

Rigney et al, RFC 2866 "Radius Accounting" Jun. 2000, pp. 1-28.*

RFC 2547, "BGP/MPLS VPNs"; Network Working Group, Mar. 1999.

RFC 1661, "The Point-to-Point Protocol (PPP)"; Network Working Group, Jul. 1994.

* cited by examiner

PRIOR ART

METHOD AND SYSTEM FOR PROVIDING AUTHORIZATION, AUTHENTICATION, AND ACCOUNTING FOR A VIRTUAL PRIVATE NETWORK

BACKGROUND OF THE INVENTION

The present invention relates generally to communication networks, and more specifically, to authorization, authentication, and accounting for virtual private networks.

The Internet has changed the way that companies do business. An outgrowth of Internet technology, Virtual Private Networks (VPNs) are transforming the daily method of doing business. Virtual Private Networks serve as private network overlays on public IP network infrastructures such as the Internet. A Virtual Private Network typically uses the Internet as the transport backbone to establish secure links with business partners, extend communications to regional and isolated offices, and significantly decrease the cost of communications for an increasingly mobile workforce. Access VPNs enable users to access corporate resources whenever, wherever, and however they require. Access VPNs encompass analog, dial, ISDN, digital subscriber line (DSL), mobile IP, and cable technologies to securely connect mobile users, telecommuters, or branch offices. There are various types of VPNs: MPLS (Multiprotocol Label Switching, see, RFC 2547 "BGP/MPLS VPNs", E. Rosen et al., March 1999), IPSec (Internet Protocol Security), dial (L2TP, L2F, or PPTP), GRE tunnels, and ATM or Frame Relay PVCs.

A service that Service Providers (SPs) often offer to their VPN customers is managing the remote users access to the customers' VPNs. By managing the remote access, the SP relieves the customer from the responsibility of owning and managing network access servers (NAS) or home gateways for terminating a PPP session. In addition, the SP can benefit from the economies of scale by terminating the remote users of different customers on a shared device and mapping each to the corresponding customer's VPN. The shared device may be a network access server (NAS) or a home gateway, and may be referred to as a virtual home gateway (VHG).

The VHG is a SP device capable of terminating a PPP (Point-to-Point Protocol) sessions of different remote user and mapping each session to the corresponding customer's VPN. (For additional information on PPP see, RFC 1661, "The Point-to-Point Protocol (PPP)", W. Simpson, July 1994)). Traditionally with PPP, the entity that terminates a PPP session is responsible for managing and coordinating all authorization, authentication, and accounting (AAA) operations related to that session.

Figure 1:
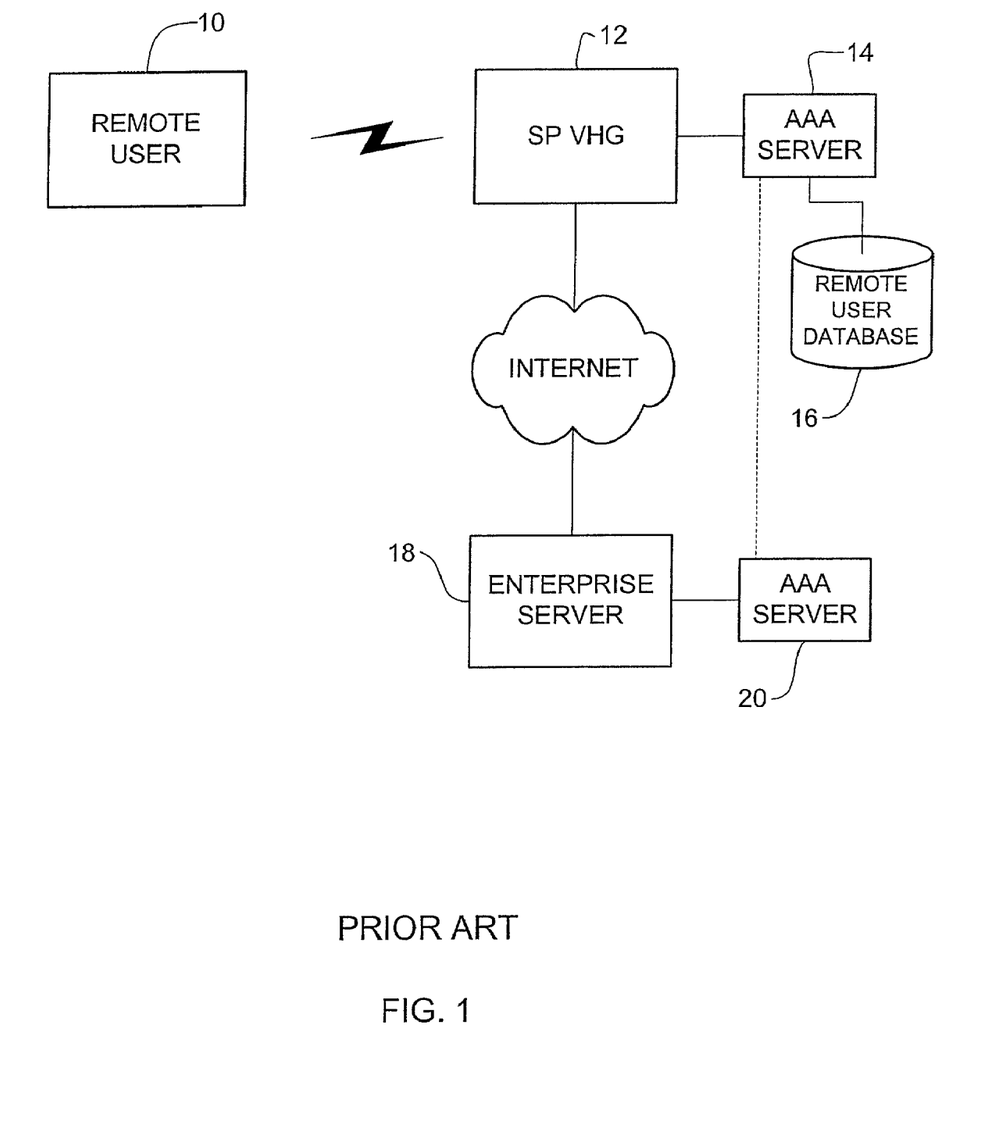
FIG. 1 is a diagram illustrating a prior art network for providing AAA operations by a service provider to a remote user.

An AAA server is a software application that performs authorization, authentication, and accounting functions, usually by interacting with network access servers, or gateways and databases or directories containing user information. AAA servers provide a security mechanism to protect a company's investments by permitting only certain entities (such as individuals or system processes) to access those investments, by governing what those entities can do once they are authenticated, and by logging or auditing the actions that are preformed for future reference and troubleshooting purposes. The SP's AAA server may be, for example, a RADIUS (Remote Authentication Dial In User Service) server or a TACACS (Terminal Access Controller Access Control System Plus) server. FIG. 1 illustrates a prior art system for providing authorization, authentication, and accounting operations at a service provider. The remote user 10 communicates with the SP VHG 12 via dial-up, DSL, or other type of connection. The SP has an AAA server 14 that includes a database 16 containing information on all remote users that have access to a VPN. After authenticating and authorizing the remote user 10, the SP connects the remote user with the VPN through its enterprise server (or firewall) 18. The VPN has its own private AAA server 20. As further described below, the SP's AAA server 14 may communicate directly with the VPN's private AAA server 20. The following describes details of the authorization, authentication, and accounting operations of this conventional system and drawbacks associated with this system.

Authorization is the process of giving permission to an entity to access a system resource. For example, network access can be restricted based on the identity of a client. Authorization provides the function of associating a remote user with a customer VPN and possibly applying policies specific to that particular VPN which may not be specific to the remote user. Authorization is usually based on either the user's domain name (e.g., @cisco.com) or, in the case of dial-up, the DNIS (Dial Number Information Service). The SP has two main options for performing the authorization functions. One is to configure the authorization information locally on the VHG. This is appropriate for SPs who do not have an AAA server. The second option is for the VHG to send an AAA request to the SP's AAA server to authorize the remote user.

Authentication is the process of verifying the identity of an entity. This process is usually done by exchanging information to prove one's identity. This information may take the form of a password, token, or one-time password, for example. In order for the SP to perform customer complete authentication of the customers' remote users, it must maintain a complete and up-to-date database of all the remote users of each customer. This has a clear drawback for large customers. One solution to this problem is to do proxy authentication. Proxy authentication requires the SP to have an AAA server. At session initiation time, the VHG is only capable of sending one AAA request per remote user. The same request must be used to both authorize and authenticate the remote user's PPP session.

The VHG first sends an AAA request to the SP AAA server for the incoming remote user. The SP's AAA server authorizes the remote user and associates it with a specific customer's VPN. The SP AAA server also determines the address of the VPN customer's AAA server. The SP AAA server proxies the AAA request to the customer's AAA server. The customer AAA server authenticates the remote user and responds to the SP AAA server with either success or failure. The SP AAA then sends a response back to the VHG with the results of the authorization and authentication operations. Drawbacks to this approach are that it requires the SP to have an AAA server and requires the SP AAA server and the customer AAA server to communicate. This can pose a security risk. Since the customer AAA server is in the customer VPN and the SP AAA server is either in the SP's management VPN or in its global routing table, routes must be redistributed (exported, imported, and filtered) between the customer VPN's routing table and the SP VPN's routing table so that the two AAA servers can communicate. It is possible to accomplish this route redistribution in a secure fashion, but it is a rather complex operation that is prone to configuration errors.

Accounting enables a network manager to keep track of the services and resources that are used by the users. The accounting process collects information such as the connection time, identity, and billing information. Conventional VHGs can only send accounting records to a single group of AAA servers that must be reachable via a global routing table. As a result, the VHG only sends accounting records to the SP's AAA server. However, because the VPN customers are also interested in receiving accounting records for their remote users, the SP's AAA server can be configured to save a copy of the accounting records and then proxy the same record to the VPN customer's AAA server. The process of proxying accounting records suffers from the same drawbacks discussed above for proxy authentication.

If the PPP session terminates on an access server or a home gateway inside the customer network, then the customer is typically responsible for the AAA operations. However, if the PPP session terminates on an SP's VHG, then the SP is responsible for the AAA operations. As described above, there are many drawbacks to the SP performing AAA operations and what is needed is a more secure and easier to configure mechanism for performing AAA operations in an SP managed remote access environment.

SUMMARY OF THE INVENTION

A method and system for providing authentication in a virtual private network is disclosed. The virtual private network includes a private AAA server. The method generally includes receiving a request from a remote user for connection with a virtual private network at a virtual home gateway and associating the remote user with the virtual private network The virtual home gateway sends a request to authenticate the remote user to the AAA server. The remote user is then connected to the virtual private network if the AAA server authenticates the user.

The authorization of the remote user may be performed by an AAA server connected to the virtual home gateway if the service provider has an AAA server. The accounting may be performed at the AAA servers of both the service provider and the virtual private network, only one of the AAA servers, or different accounting information may be sent to each AAA server. The virtual home gateway may include a plurality of routing tables for different virtual private networks. The virtual home gateway has access to a database comprising information such as virtual private network IDs and addresses of the virtual private network AAA servers. The AAA server of the virtual private network is coupled to a database comprising information on remote users that are allowed to access to the virtual private network.

A system of the present invention generally includes a virtual home gateway configured to receive requests from a remote user for connection with a virtual private network, send a request to authenticate the remote user to the AAA server of the virtual private network, and connect the remote user to the virtual private network. The system further includes a database for storing addresses of virtual private network AAA servers and a processor operable to look up the address of the virtual private network AAA server based on information received from the remote user.

In another aspect of the invention, a computer program product for providing authentication in a virtual private network generally includes code that receives a request from a remote user for connection with a virtual private network at a virtual home gateway and that associates the remote user with the virtual private network. The product further includes code that sends a request to authenticate the remote user from the virtual home gateway to the AAA server and code that connects the remote user to the virtual private network if the AAA server authenticates the user. A computer-readable storage medium is provided for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 2:
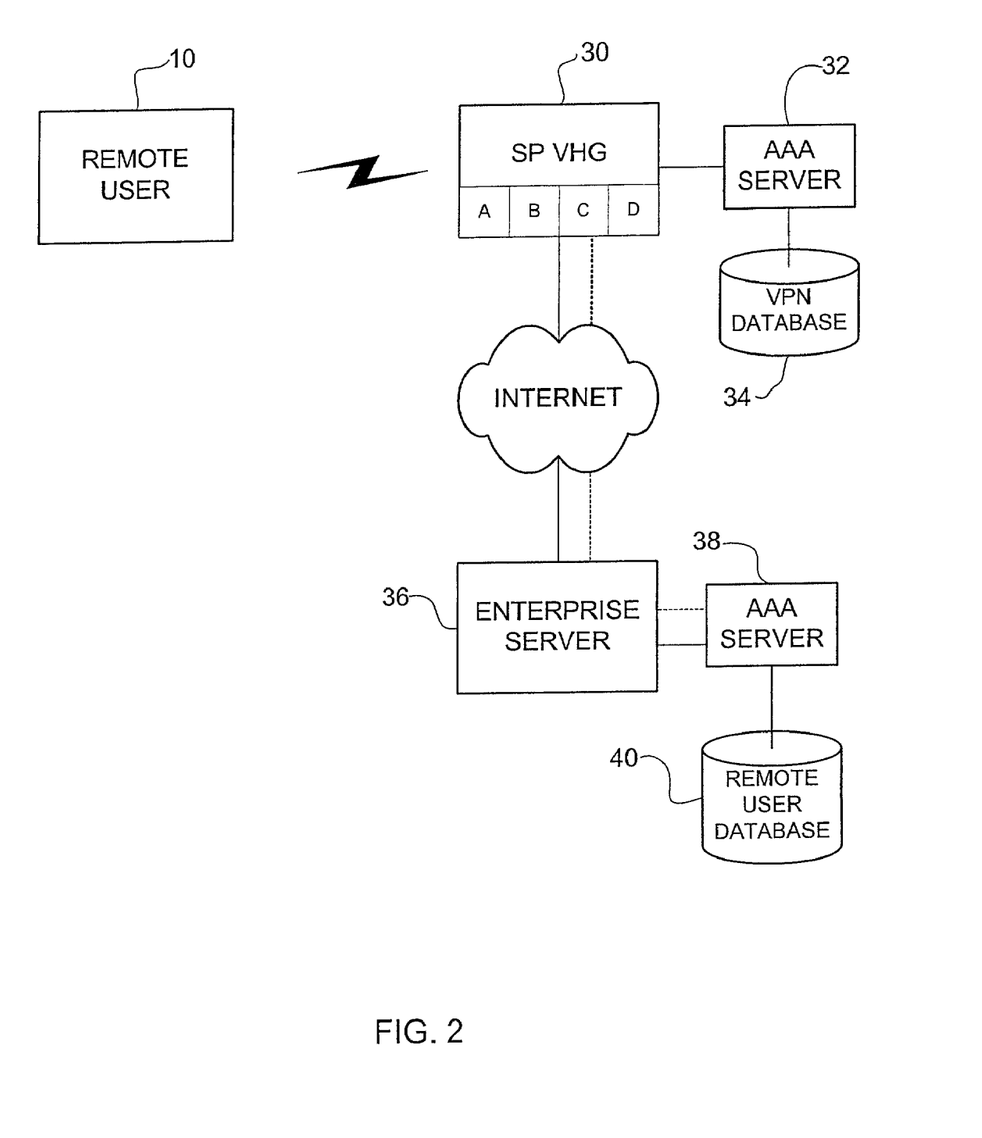
FIG. 2 is a diagram illustrating a network utilizing a system of the present invention for providing AAA operations for a VPN.

Referring now to the drawings, and first to FIG. 2, a system of the present invention is shown. The system eliminates the need for an AAA proxy and all the associated security hazards by allowing an AAA server located within a virtual private network to communicate directly with a service provider. As further described below, the system allows service providers to eliminate their AAA servers. Furthermore, the service provider's virtual home gateway may be configured to communicate with a plurality of different virtual private network AAA servers. Authorization is preferably performed at the service provider while the authentication is performed at the virtual private network, thus providing a clear separation between authorization and authentication functions.

The present invention operates in the context of a data communication network including multiple network elements. The network includes a service provider that manages remote access of different customers to their enterprise server. The service provider network includes a virtual home gateway (VHG) 30 that is accessed by remote user 10. The VHG 30 may be a network access server (NAS) or a home gateway, for example. VHG 30 is preferably a shared device having a plurality of routing tables (A, B, C, D) for different virtual private networks. The service provider may include an AAA server 32, however, it is not necessary. The AAA server 32 includes a database 34 containing addresses of VPNs' AAA servers and may include other information such as VPN IDs. Each VPN has an associated group of remote users that are not individually identified, but identified by indicators such as domain name (e.g., cisco.com), DNIS (phone number or ID stream for a dial network (e.g., 1-800-xxx-xxxx)), circuit ID for a DSL network, or wireless network ID, for example. The virtual private network includes an enterprise server (firewall) 36, AAA server 38, and database 40. The database includes a list of all remote users that are allowed access to the VPN. For example, the database 40 may include a list of usernames (e.g., Joe@cisco.com). Thus, the SP AAA server 32 is used to authorize an entire VPN, while the VPN AAA server 38 authenticates and authorizes individual VPN users. Accounting requests are preferably sent to both AAA servers 32, 38 since it is easy to match start and stop records based on the full username, and in the case of dispute both the service provider and the VPN customer have the same level of accounting details.

Figure 3:
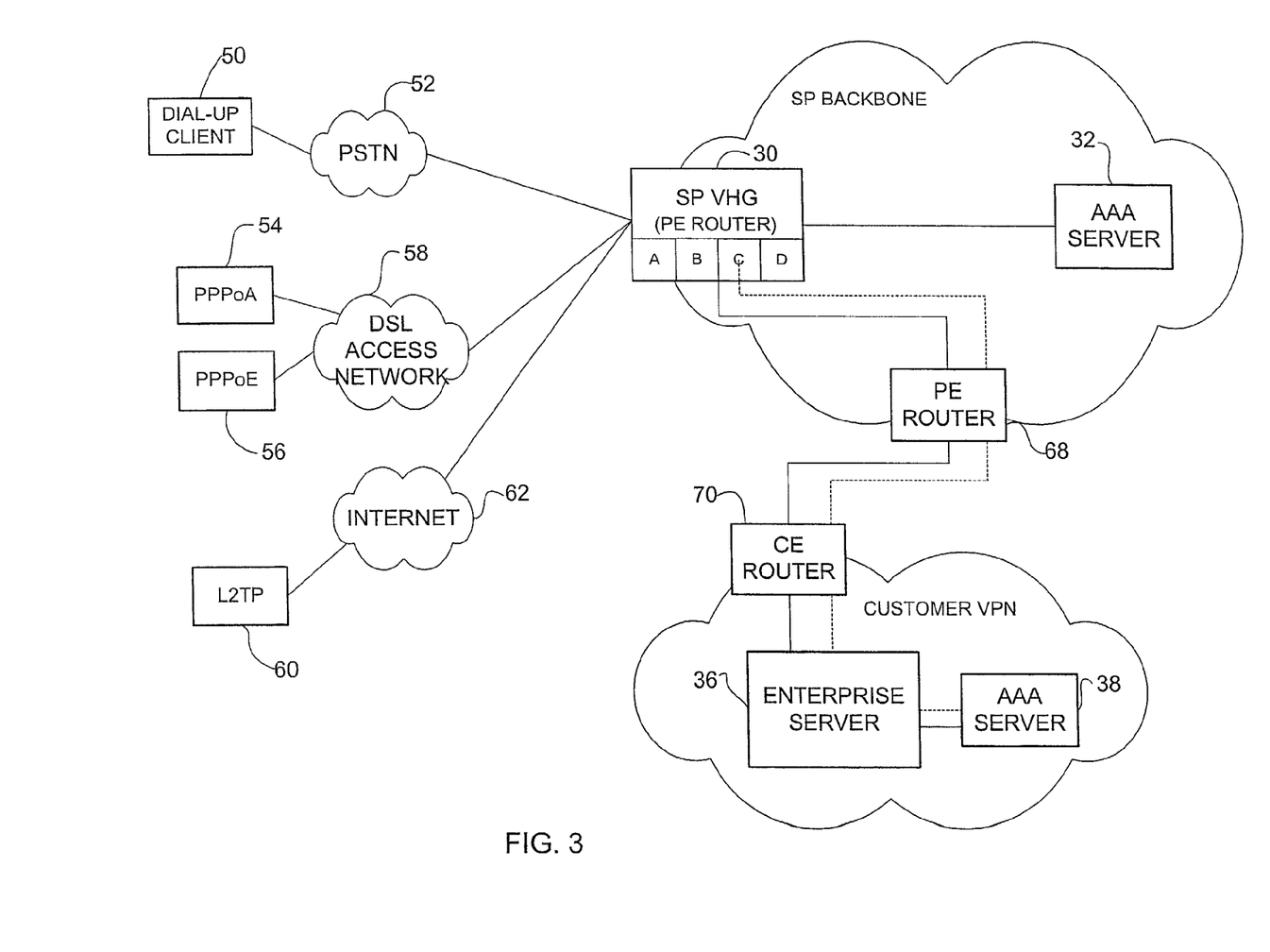
FIG. 3 is a diagram illustrating additional detail of a network utilizing the system of FIG. 2.

FIG. 3 illustrates additional detail of the system of FIG. 2. The remote user may include, for example, dial-up client 50 (with access to the SP through a PSTN 52), PPP over ATM (PPPoA) 54 or PPP over Ethernet (PPPoE) 56 having access through a DSL access network 58, or Layer 2 Tunneling Protocol (L2TP), having access through the Internet 62, or any other remote access systems and methods, as is well known by those skilled in the art. The service provider VHG 30 operates as a Provider Edge (PE) router and receives data from the remote user. The service provider also includes PE router 68 which transmits data to a Customer Edge (CE) router 70 at the customer VPN. It is to be understood that the network shown and described herein is only one example of a network that may utilize the system and method of the present invention and that the system and method may be used in different types of networks without departing from the scope of the invention.

Figure 4:
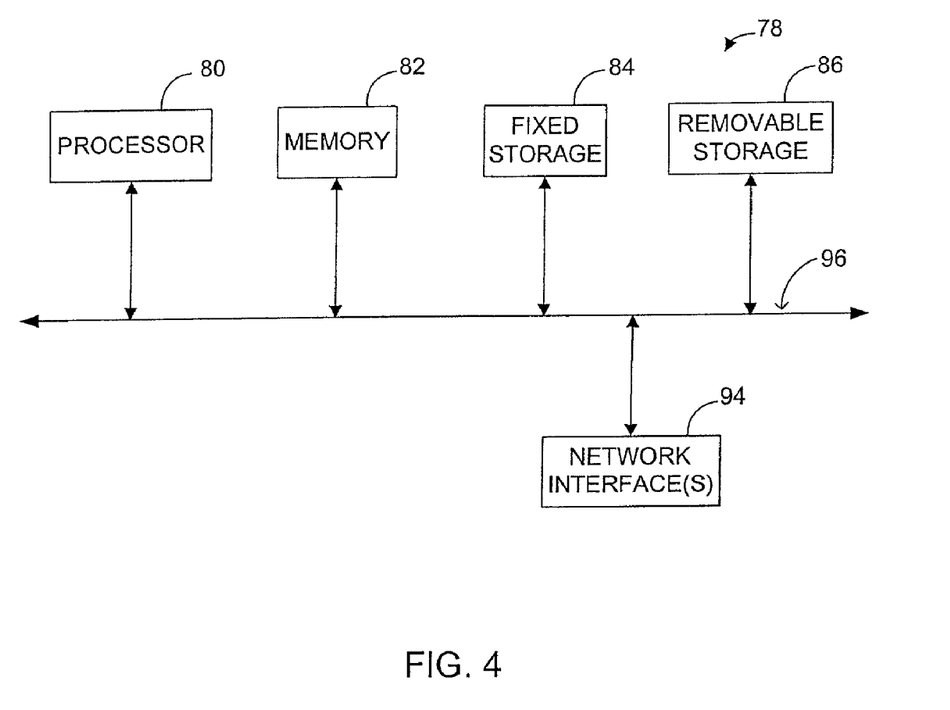
FIG. 4 is a system block diagram of a computer system that can be utilized to execute software of an embodiment of the present invention.

FIG. 4 shows a system block diagram of computer system 78 that may be used to execute software of an embodiment of the invention. The computer system 78 includes memory 82 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 78 further includes subsystems such as a central processor 80, fixed storage 84 (e.g., hard drive), removable storage 86 (e.g., CD-ROM drive), and one or more network interfaces 94. Other computer systems suitable for use with the invention may include additional or fewer subsystems. For example, computer system 78 may include more than one processor 80 (i.e., a multi-processor system) or a cache memory. The computer system 78 may also include a display, keyboard, and mouse (not shown) for use as a host.

The system bus architecture of computer system 78 is represented by arrows 96 in FIG. 4. However, these arrows are only illustrative of one possible interconnection scheme serving to link the subsystems. For example, a local bus may be utilized to connect the central processor 80 to the system memory 82. Computer system 78 shown in FIG. 4 is only one example of a computer system suitable for use with the invention. Other computer architectures having different configurations of subsystems may also be utilized. Communication between computers within the network is made possible with the use of communication protocols, which govern how computers exchange information over a network.

Figure 5:
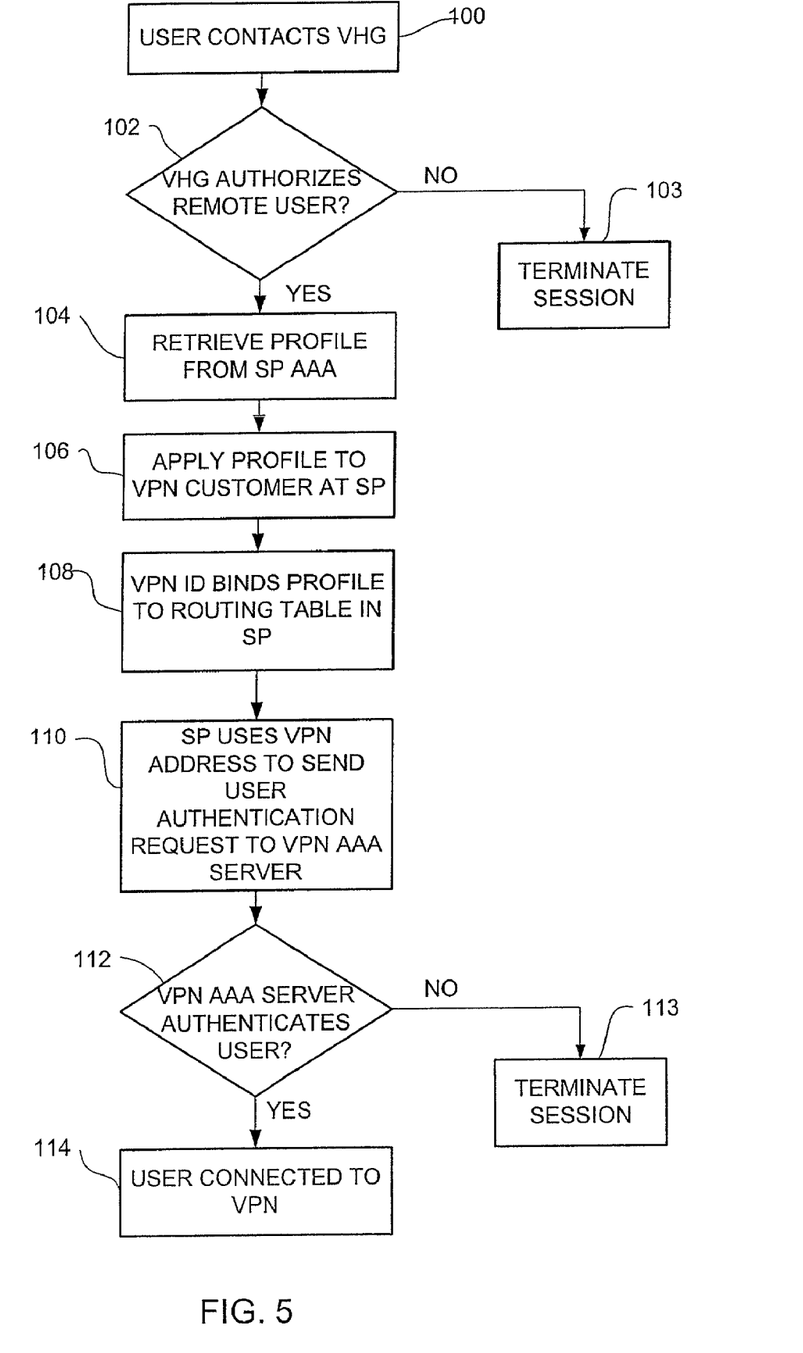
FIG. 5 is a flowchart illustrating a process of the present invention for providing authorization and authentication in a virtual private network.
Figure 6:
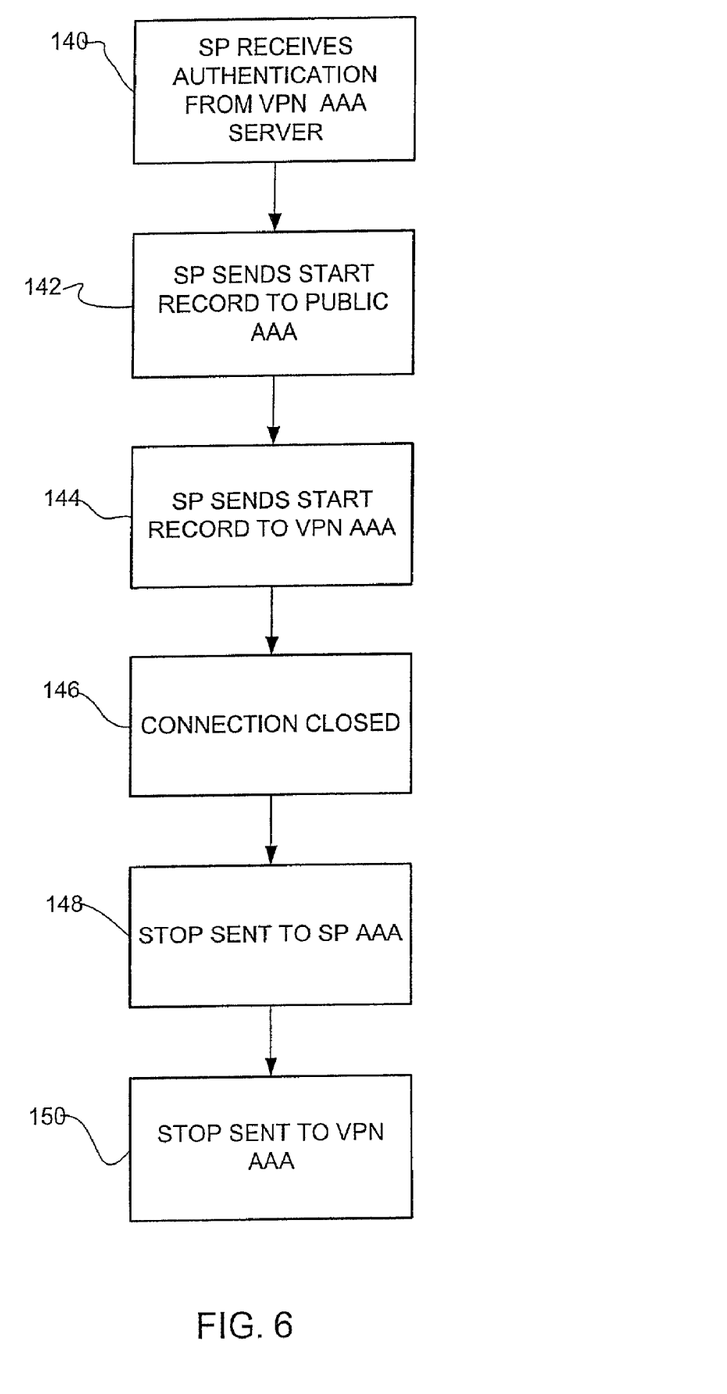
FIG. 6 is a flowchart illustrating an accounting process for the virtual private network.

FIGS. 5 and 6 are flowcharts illustrating authorization, authentication, and accounting operations performed with the above-described system. A user first contacts the VHG 30 at step 100 (FIG. 5). When VHG 30 receives an incoming PPP session, it passes the authorization entity, such as domain name or DNIS, to the SP AAA server 32. When the VHG 30 sends an AAA request, it is routed using either the SP's management VPN or a global routing table. If an SP AAA server is used, the VHG sends two AAA requests. The first request is for authorizing the remote user and is routed to the SP's AAA server using either SP's management VPN or the SP's global routing table. The second request is for authenticating the remote user and is routed to the customer's AAA server using the VPN customer's routing table. The VHG 30 may authorize the remote user 10 either locally or by sending a request to the SP AAA server 38. If the user is not authorized by the VHG 30, the session is terminated (steps 102 and 103). A successful authorization operation associates the remote user with a VPN. The SP AAA server 32 returns the VPN AAA server address along with a VPN ID and other information necessary to communicate with the customer's AAA server. The information may include, for example, a key for use with a Radius server. The VHG 30 determines which VPN the customer belongs to based on the VPN ID. The profile is retrieved from the SP AAA server 32 (step 104) and applied to the VPN customer at the SP (step 106). The VPN ID binds the profile to routing table in VHG 30 (step 108). The VPN AAA server address is interpreted by the VHG 30 within the correct VPN context. The VHG 30 looks up the VPN ID to find the corresponding virtual routing forwarding (VRF) instance. In order to communicate with the VPN AAA server 38, the VHG 30 has a local address belonging to the VRF. The address is used as source address to send user requests to the VPN AAA server 38. The VHG 30 sends an AAA request to the customer's AAA server 38 to authenticate the remote user 10 (step 110). Upon successful authentication, the VPN AAA server 38 responds to VHG 30 with a success message, which may contain per-user authorization data. The VHG 30 applies the per-user configuration to the PPP session. The VHG 30 then continues setting up the remote user's PPP session and when initialization is complete, packets will start to flow to and from the remote user 10 (steps 112 and 114). If the authentication is not successful the connection is terminated (steps 112 and 113).

For accounting, the VHG 30 preferably sends any accounting request related to a given remote user to the AAA servers of both the SP and the customer. Once the SP receives authentication from the VPN AAA server 38 (step 140), the SP sends start records to the SP AAA server 32 and VPN AAA server 38 (steps 142, 144). The accounting record sent to the SP's AAA server 32 is routed using either the SP's management VPN or the SP's global routing table. The accounting record sent to the customer's AAA server 38 is routed using the customer VPN's routing table. If the customer is not interested in accounting records then the accounting records can be sent only to the SP AAA server 32. If the SP does not have an AAA server, the accounting records are sent to the VPN AAA server 38 only. Also, different accounting information may be sent to the SP AAA server 32 and the VPN AAA server 38. For example, the customer may be interested only in the duration of a connection and the number of packets or bytes which are transferred in both directions. The SP may be interested in additional information related to the utilization of the resources on the VHG 30. At step 146 the connection is closed and a stop is sent to the SP AAA server 32 and the VPN AAA server 38 (steps 148 and 150).

As can be observed from the foregoing, the present invention has numerous advantages. The system and method of the present invention allow service providers to operate without dedicated AAA servers and provides a clear separation between the authorization and authentication functions. Furthermore, the system allows different accounting information to be sent to the SP and the customer.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing authorization, authentication, and accounting (AAA) in a virtual private network having a first AAA server, the method comprising:

receiving a request from a remote user for connection with a virtual private network at a virtual home gateway, said virtual home gateway in communication with a second AAA server wherein the second AAA server is a service provider server and is not located within said virtual private network;

associating the remote user with the virtual private network at the virtual home gateway, wherein associating the remote user comprises receiving a virtual private network identification (ID) and address of the first AAA server;

performing a lookup of the address of the first AAA server at the virtual home gateway;

sending a request to authenticate the remote user with said virtual private network from the virtual home gateway to the first AAA server located within said virtual private network; and sending a request to the second AAA server to authorize the remote user with said virtual private network from the virtual home gateway;

connecting the remote user to the virtual private network if the first AAA server successfully authenticates the remote user and the second AAA server successfully authorizes the remote user; and sending accounting information directly to the first AAA server and the second AAA server from the virtual home gateway;

wherein authentication of the remote user is performed at the first AAA server without contacting the second AAA server associated with the virtual home gateway.

2. The method of claim 1 wherein the virtual private network ID binds a profile of the virtual private network to a routing table of the virtual home gateway.

3. The method of claim 1 wherein the second AAA server contains the address of the first AAA server.

4. The method of claim 1 wherein sending a request to authenticate the remote user comprises routing the request using a customer routing table of the virtual private network.

5. The method of claim 1 wherein connecting the remote user to the virtual private network comprises setting up a PPP session for the remote user.

6. The method of claim 1 further comprising sending an accounting request to the first AAA server.

7. The method of claim 6 further comprising sending an accounting request to the second AAA server.

8. The method of claim 7 wherein accounting information sent to the first AAA server is different than accounting information sent to the second AAA server.

9. The method of claim 1 wherein associating a remote user with the virtual private network comprises identifying the virtual private network based on a domain name.

10. The method of claim 1 wherein associating a remote user with the virtual private network comprises identifying the virtual private network based on a dial-up phone number.

11. The method of claim 1 wherein associating a remote user with the virtual private network comprises identifying the virtual private network based on a circuit ID.

12. A computer-readable storage medium encoded with a computer program for providing authorization, authentication, and accounting (AAA) in a virtual private network having a first AAA server, the computer program comprising:

code that receives a request from a remote user for connection with a virtual private network at a virtual home gateway, said virtual home gateway in communication with a second AAA server wherein the second AAA server is a service provider server and is not located within said virtual private network;

code that associates the remote user with the virtual private network, at the virtual home gateway, wherein code that associates the remote user comprises code that receives a virtual private network identification (ID) and address of the first AAA server;

code that performs a lookup for an address of the first AAA server at the virtual home gateway;

code that sends a request to authenticate the remote user with said virtual private network from the virtual home gateway to the first AAA server located within said virtual private network;

code that sends a request to the second AAA server to authorize the remote user with said virtual private network from the virtual home gateway;

code that connects the remote user to the virtual private network if the first AAA server successfully authenticates the remote user and the second AAA server successfully authorizes the remote user;

code that sends accounting information directly to the first AAA server and the second AAA server from the virtual home gateway; and a computer-readable storage medium for storing the codes;

wherein authentication of the remote user is preformed at the first AAA server without contacting the second AAA server associated with the virtual home gateway.

13. The computer-readable storage medium of claim 12 further comprising code that sends accounting requests to the first AAA server.

14. The computer-readable storage medium of claim 12 further comprising code that binds a profile of the virtual private network to a routing table of the virtual home gateway.

15. A system for providing authorization, authentication, and accounting (AAA) in a virtual private network having a first AAA server, the system comprising:

a virtual home gateway configured to receive requests from a remote user for connection with one of a plurality of virtual private networks in communication with the virtual home gateway;

associate the remote user with the virtual private network;

perform a lookup of the address of the first AAA server;

send a request to authenticate the remote user from the virtual home gateway to the first AAA server located within the virtual private network, and send a request to authorize the remote user from the virtual home gateway to the second AAA server located outside the virtual private network;

connect the remote user to the virtual private network if the first AAA server successfully authenticates the remote user and the second AAA server successfully authorizes the remote user and;

send accounting information from the virtual home gateway to the first AAA server and the second AAA server;
a database for storing the address of the first AAA server; and
a processor operable to look up the address of the virtual private network first AAA server based on information received from the remote user so that authentication is performed directly between the virtual home gateway and the first AAA server without contacting the second AAA server associated with the virtual home gateway;
wherein a virtual private network identification (ID) and address of the first AAA server is used to associate the remote user with the virtual private network, and wherein the virtual home gateway is configured to route the request to authenticate the remote user using a customer routing table of the virtual private network, and the second AAA server is a service provider server and is not located within the virtual private network.

16. The system of claim 15 wherein the information received from the remote user is a circuit ID.

17. The system of claim 15 wherein the information received from the remote user is domain name.

18. The system of claim 15 wherein the information received from the remote user is a dial-up phone number.

19. The system of claim 15 wherein the database includes the virtual private network IDs used to bind virtual private network profiles to a routing table of the virtual home gateway.

20. The system of claim 19 wherein the virtual home gateway comprises a plurality of routing tables corresponding to different virtual private networks.

21. A system for providing authorization, authentication, and accounting (AAA) in a virtual private network having a first AAA server, the system comprising:

means for receiving a request from a remote user for connection with a virtual private network at a virtual home gateway, said virtual home gateway in communication with a second AAA server wherein the second AAA server is a service provider server and is not located within said virtual private network;

means for associating the remote user with the virtual private network, at the virtual home gateway, wherein means for associating the remote user comprises means for receiving a virtual private network identification (ID) and address of the first AAA server;

means for performing a lookup for an address of the first AAA server at the virtual home gateway;

means for sending a request to authenticate the remote user with said virtual private network from the virtual home gateway to the first AAA server located within the virtual private network;

means for sending a request to the second AAA server to authorize the remote user with the virtual private network from the virtual home gateway;

means for connecting the remote user to the virtual private network if the first AAA server successfully authenticates the remote user and if the second AAA server successfully authorizes the remote user; and means for sending accounting information directly to the first AAA server and the second AAA server from the virtual home gateway;

wherein authentication of said remote user is performed at the first AAA server without contacting the AAA server associated with the virtual home gateway.

22. The system of claim 21 wherein the second AAA server contains the address of the virtual private network's AAA server.

* * * * *